Figure 1:
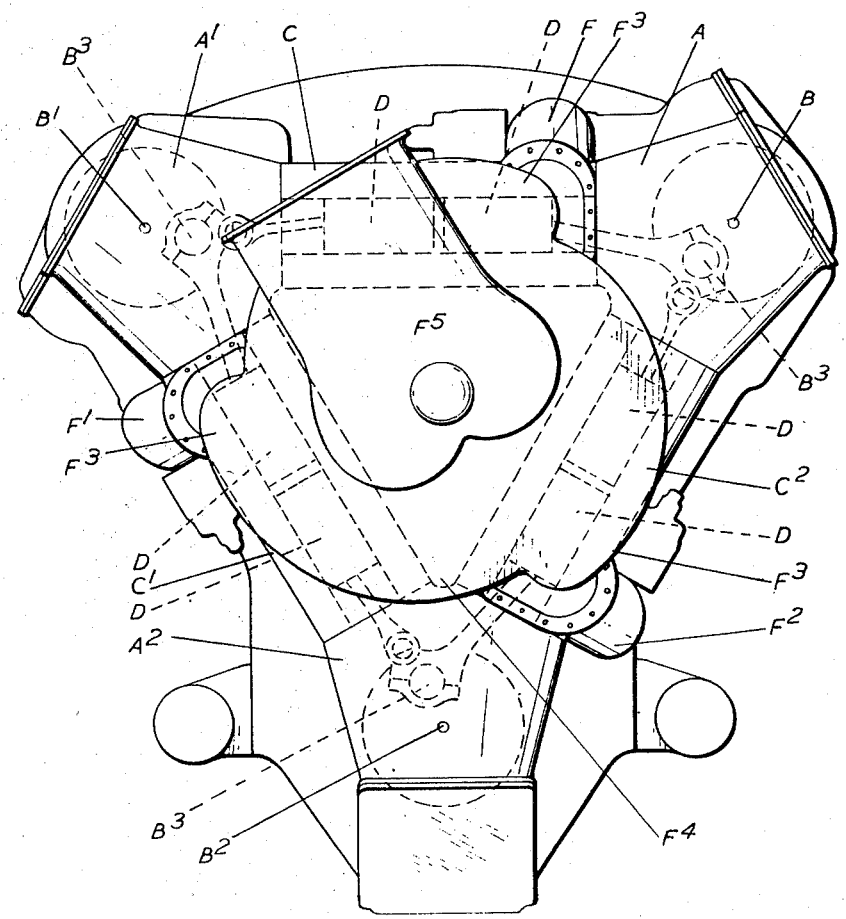

May 15, 1951    B. W. BARLOW    2,552,662
CONNECTING ROD ASSEMBLY FOR MULTICYLINDER RECIPROCATING ENGINES
HAVING TWO OR MORE CYLINDERS OR ROWS OF CYLINDERS
ANGULARLY DISPLACED ABOUT A CRANKSHAFT
Filed April 3, 1950    4 Sheets-Sheet 3

Inventor
Benjamin W. Barlow
By
Emery, Holcombe & Blair
Attorney

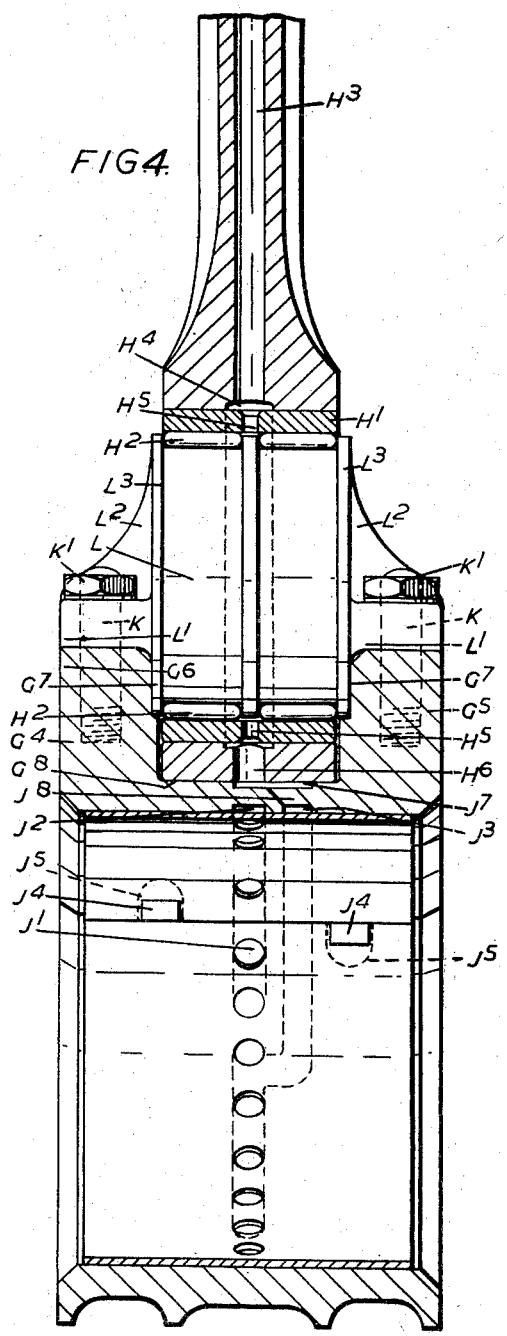
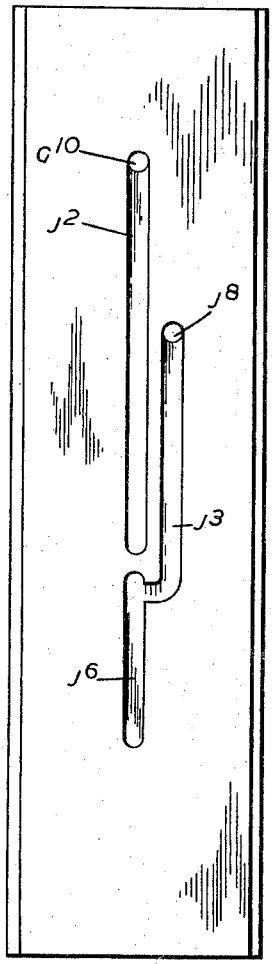

Patented May 15, 1951

2,552,662

UNITED STATES PATENT OFFICE 2,552,662

CONNECTING ROD ASSEMBLY FOR MULTI-CYLINDER RECIPROCATING ENGINES HAVING TWO OR MORE CYLINDERS OR ROWS OF CYLINDERS ANGULARLY DISPLACED ABOUT A CRANKSHAFT

Benjamin William Barlow, Sudbury, Wembley, England, assignor to D. Napier & Son Limited, London, England, a company of Great Britain Application April 3, 1950, Serial No. 153,728
In Great Britain April 11, 1949

9 Claims. (Cl. 74—580)

This invention relates to connecting rod assemblies for reciprocating engines having two or more cylinders or rows of cylinders angularly displaced about the axis of rotation of a crank shaft and of the kind comprising a connecting rod, hereinafter for convenience termed the master rod connected to a piston in one of two angularly displaced cylinders and having a big end which constitutes or carries a bearing surrounding a crank pin on the crank shaft and at least one other connecting rod, hereinafter for convenience called the subsidiary rod connected to a piston in another of the angularly displaced cylinders and having a big end which constitutes or carries a bearing surrounding a journal pin rigidly connected to the master rod.

An object to the invention is to provide a connecting rod assembly of the above kind which will not only be mechanically satisfactory but will tend to reduce the dimensions of the parts associated with the connection of the subsidiary rod to the master rod so as to reduce the clearances which have to be left around the master rod and subsidiary rod and more particularly to permit of a reduction in the width of any slot or slots which have to be provided in the inner end of the cylinder, cylinder liner or sleeve valve in which reciprocates the piston to which the subsidiary rod is connected.

Hitherto it has been customary in such assemblies to provide a lateral projection on the big end of the master rod with a deep slot therein to receive the big end of the subsidiary rod and to pass a journal pin for the big end of the subsidiary rod through holes in the projection and through the bearing of the big end of the subsidiary rod. In such an arrangement the lateral projection from the big end of the master rod was necessarily of considerable dimensions with the result that where for dimensional reasons clearance slots were provided in the inner end of the cylinder, cylinder liner or sleeve valve containing the piston connected to the subsidiary rod to provide clearance for this projection these slots had to be comparatively wide and deep.

A connecting rod assembly of the kind referred to according to the present invention for a reciprocating engine having two cylinders angularly displaced from one another about the axis of rotation of a crank shaft comprises a main connecting rod having a big end carrying or constituting a bearing surrounding a crank pin on the crank shaft, and a journal member for a second connecting rod comprising a cylindrical bearing member formed at its ends with lugs adapted to be bolted or similarly secured to a pair of spaced platforms formed upon the big end of the main connecting rod.

The spaced platforms constituting the pair preferably lie on opposite sides of a groove which accommodates part of the big end of the subsidiary connecting rod, while further, the lugs on the journal member for the subsidiary connecting rod conveniently lie in locating slots or recesses in the platforms, and are formed on the ends of the journal member in such a position that their outer faces against which bear the nuts or heads of the bolts securing them to the platforms lie nearer to the axis of the crank pin to which the main connecting rod is coupled than does the axis of the journal member for the subsidiary connecting rod.

Thus, in a convenient arrangement each of the lugs on an end of the subsidiary journal member comprises a substantially rectangular base portion adapted to lie within a corresponding rectangular recess in the face of its platform and having holes therein through which pass bolts or studs by which it is secured to the platform, and a web lying in a plane at right angles to the rectangular portion and containing the axis of the journal member, this web which thus lies between the bolts or studs, extending between the outer face of the rectangular portion and the adjacent end face of the journal member. The outer face of the platform in such an arrangement conveniently lies appreciably below the axis of the journal member so that the common plane in which the outer ends of the bolt heads or studs lie extends close to but preferably not appreciable beyond the axis of the journal member.

The invention may be carried into practice in various ways but the following is a description by way of example of one construction according to the invention applicable for example to an engine having three parallel crank shafts angularly disposed at equal intervals about a central axis and two rows of cylinders displaced by an angle of 60° about each crank shaft axis, each pair of adjacent cylinders which lie in a plane at right angles to the crank shaft axes being associated with a single crank pin upon the related crank shaft. The description is made with reference to the accompanying drawings, in which Figure 1 is an end elevation of an engine of the kind to which the invention is particularly applicable, Figure 2 is a cross section on an enlarged scale through one of the cylinders of the engine shown in Figure 1 in a plane containing the cylinder axis and at right angles to the axes of the two crankshafts associated with the cylinder, Figure 3 is an elevation on an enlarged scale of one of the connecting rod assemblies according to the invention used in the construction shown in Figure 2, part being broken away and shown in cross section.

Figure 3:
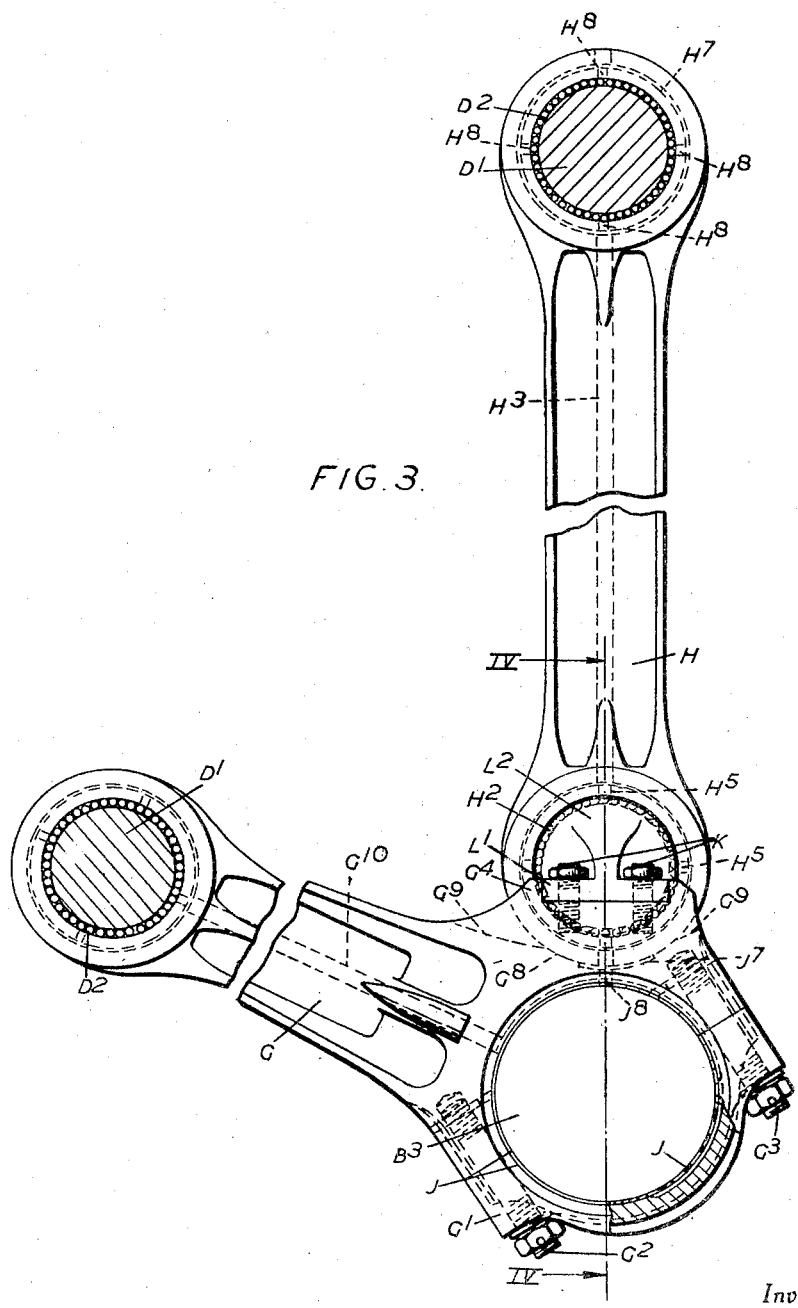

Figure 4 is a cross section through the big end portion of the connecting rod assembly shown in Figure 3 in a plane containing the axes of the big ends of the two connecting rods, the big end journal member for the subsidiary connecting rod being shown in elevation, and Figure 5 is a development view of the inner surface of the big end bearing housing of the master rod.

Figure 2:
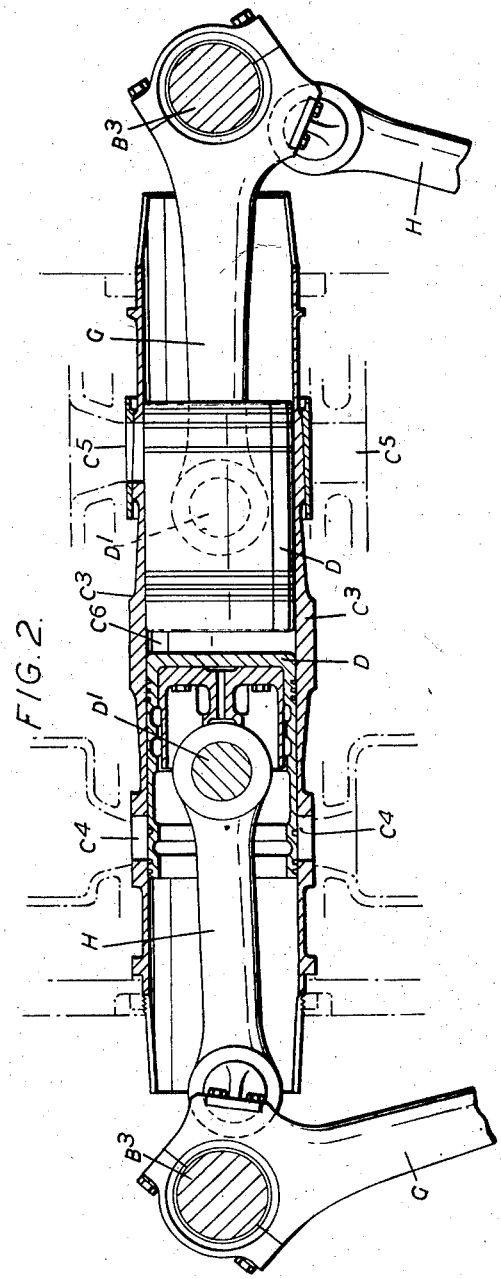

The engine to which the invention is shown applied by way of example comprises, as shown in Figures 1 and 2, three crankcases A, $A^1$ and $A^2$ each containing and supporting a crankshaft B, $B^1$, $B^2$ of the conventional six cylinder type, so that the axes of the three crankshafts B, $B^1$ $B^2$, lie at the apices of an equilateral triangle.

Extending between and connecting each adjacent pair of crankcases is a cylinder block C, $C^1$, $C^2$, containing six open ended cylinders $C^3$ in each of which reciprocate two pistons D connected respectively to the two crankshafts in the two crank cases. The engine operates on the two stroke cycle to which end the pistons D move towards and away from one another in each cylinder $C^3$ and, while one of the pistons D uncovers exhaust ports $C^4$ in the cylinder towards the end of its outstroke the other piston uncovers inlet ports $C^5$. The combustion chambers are thus constituted by the centre portions $C^6$ of the lengths of the cylinders. In Figure 1 the inlet manifolds which communicate with the inlet ports in the cylinders can be seen at F, $F^1$, $F^2$ and are arranged to be fed with scavenging and charging air through delivery volutes $F^3$ from a centrifugal compressor $F^4$ secured to one end of the engine and having an air intake $F^5$.

It will thus be seen that each crank pin $B^3$ on each crankshaft B, $B^1$, $B^2$ is coupled to two pistons D and this is effected by a connecting rod assembly comprising a master rod G having a big end bearing which directly engages the crank pin $B^3$ and a subsidiary rod H pivoted to the big end of the master rod, the arrangement being such, as shown in Figure 2 that one of the pistons D in each cylinder is connected by its gudgeon pin $D^1$ to a master rod G while the other is connected to a subsidiary rod H.

The construction of each connecting rod assembly, as shown in Figures 3, 4 and 5 is as follows:

The master rod G and the subsidiary rod H contain each at their small ends needle roller bearings $D^2$ mounted on the gudgeon pins $D^1$. The master rod has a big end which is conveniently split in a plane lying at approximately 60° to the longitudinal axes of the master rod to permit insertion of a split big end bearing J. The removable strap portion $G^1$ of the big end lies on the side of the body of the master rod remote from the two associated pistons, so as to leave integral with the body of the rod that part of the big end which faces the subsidiary rod piston. The strap is secured to the body of the rod by means of two screwthreaded studs $G^2$, $G^3$, and co-operating nuts in usual manner.

The part of the big end of the master rod upon which the subsidiary rod is mounted is somewhat thickened radially at $G^4$ and this thickened portion is provided with a comparatively deep and wide slot lying in a plane at right angles to the crankshaft axis as shown in Figures 2, 3 and 4 and adapted to accommodate a part of the big end of the subsidiary rod. It will be seen thus that the radial thickening provides in effect a pair of platforms $G^5$, $G^6$, facing the subsidiary piston with the slot between them. These two platforms are formed with similar wide rectangular slots in their outer faces extending across them in a direction parallel to the crank pin axis. Displaced from the sides of each of these slots and projecting from the bases of the slots are four studs K. The studs pass through holes in rectangular lugs $L^1$ which are formed respectively on and project from the opposite ends of a cylindrical journal member L passing through the big end of the subsidiary rod, and are located in the slots in the platforms on the master rod to which they are rigidly secured by nuts $K^1$ engaging the outer ends of the studs and bearing on the outer faces of the lugs $L^1$. Each of the lugs $L^1$ is formed integral with its end of the journal member L and with a web $L^2$ which lies between the nuts and extends from the outer face of the lug to the adjacent face $L^3$ of the journal member.

The slot between the platforms and across which the journal member thus extends is provided in its side faces with shallow part-cylindrical recesses $G^7$ adapted to accommodate adjacent end portions $L^3$ of the journal member, the width of the big end of the subsidiary rod being somewhat less than the length of the journal member. The slot is also provided on its inner face with a part-cylindrical bearing surface $G^8$ engaging the outer surface of the big end of the subsidiary rod H and is continued lengthwise on both sides of the surface $G^8$ as shown at $G^9$.

The big end of the subsidiary rod is externally machined over the necessary arcuate length which bears against the face $G^8$ and is internally bored to receive a bearing liner $H^1$ which forms the outer race of twin needle roller bearings $H^2$ by means of which the big end is connected to the journal member L.

Lubricating oil is supplied from internal passages in the crank pin $B^3$ to the master rod big end bearing J, and also from this bearing through an arrangement of oil passages, to the subsidiary rod big end outer bearing surface $G^8$ and thence to the inner needle roller bearings $H^2$ and by a longitudinal drilling $H^3$ in the subsidiary rod to the small end bearing $D^2$. Oil is also supplied from the big end bearing J by a longitudinal drilling $G^{10}$ in the master rod to the small end bearing $D^2$. The flow of oil to the various passages in the connecting rod assembly is provided for in the following manner:

The split big end bearing liner J is provided with a number of ports $J^1$ extending round a part of a medial circumference and communicating with two passages $J^2$ and $J^3$ formed by two grooves in the inside surface of the big end, these grooves being best seen in Figure 4 and in the development of the inside surface of the big end shown in Figure 5. The liner J is formed with two pressed out tabs $J^4$ at each side of the line on which it is split, which project outwards into chamfered grooves $J^5$ so that when the strap portion $G^1$ of the big end is assembled the two halves of the liner are held from rotary or axial movement within the big end by the abutment of the ends of the tabs against the mating faces of the two parts of the big end.

The ports $J^1$ co-operate with a radial drilling in the crank pin $B^3$ whereby oil is intermittently delivered from the crank pin to the passages $J^2$ and $J^3$ as the crank pin rotates within the big end. The passage $J^2$ in the particular example shown extends over an arc of approximately $145\frac{1}{2}°$, and communicates at one end with a drilling $G^{10}$ which supplies oil to the small end bearing $D^2$, while the passage $J^3$ has a portion $J^6$ which registers with some of the ports $J^1$ and extends over an arc of aproximately 60°, while an off-set portion $J^3$ communicates with a slot formed between a groove $J^7$ in the bearing surface $G^8$ and the outer surface of the subsidiary rod big end through an oblique drilling $J^8$ in the master big end.

The groove $J^7$ is made sufficiently long in a circumferential direction to register at all times with a radial drilling $H^6$ through the big end of the subsidiary rod, the oscillating movement of this big end in its bearing being relatively small. The drilling $H^6$ communicates with an annular passage $H^4$ formed by an annular groove in the inside surface of the subsidiary rod big end, which passage delivers oil to the needle roller bearing $H^2$ through four radial ports $H^5$ in the bearing liner, and in addition communicates with the longitudinal drilling $H^3$ which delivers oil to the small end bearing $D^2$ through a similar annular passage $H^7$ and ports $H^8$ in the small end.

Thus while the crank pin $B^3$ is rotating within the master rod big end bearing J oil is supplied intermittently from this bearing to both small end bearings $D^2$, to the subsidiary rod inner bearing $H^2$, and to the subsidiary rod outer bearing surface $G^8$.

It will be seen that with such a construction the width of any slot which is provided in the skirt portion of a cylinder or liner containing the piston to which the subsidiary connecting rod is coupled in order to provide clearance for the big end assembly during rotation can be reduced to approximately the length of the subsidiary journal member, while the depth of the part of this slot which has to accommodate this journal member can be limited to that necessary to provide clearance for the journal member itself without having to provide clearance for a part of the big end of the master rod surrounding the journal member.

It is to be understood that the invention has been described with particular reference to a construction in which the master rod or each master rod has one subsidiary rod associated therewith for convenience only and that the invention may also be applied to constructions in which two or more subsidiary rods are associated with a master rod, the big end of the master rod in this case being provided with an appropriate number of pairs of platforms angularly spaced around it.

What I claim as my invention and desire to secure by Letters Patent is:

1. A connecting rod assembly for a reciprocating engine having a crankshaft and two or more cylinders angularly displaced from one another about the axis of rotation of the crankshaft, the connecting rod assembly comprising a main connecting rod and a subsidiary connecting rod, a big end bearing on the main connecting rod surrounding a crank pin on the crankshaft, two spaced platforms formed upon the big end of the main connecting rod, a cylindrical journal bearing member formed at its ends with lugs which are adapted to engage the spaced platforms, means for securing the two lugs respectively to the two platforms and a big end bearing on the subsidiary connecting rod surrounding the journal bearing member.

2. A connecting rod assembly, as claimed in claim 1, in which a part-cylindrical recess is formed between the two spaced platforms, and part of the big end of the subsidiary connecting rod lies within the recess.

3. A connecting rod assembly as claimed in claim 2, in which arcuate recesses are formed in the adjacent faces of the two platforms, and corresponding parts of the circumference of the end portions of the journal bearing member lie in the recesses.

4. A connecting rod assembly as claimed in claim 3, in which the platforms are formed with rectangular recesses, and each of the lugs on an end of the journal bearing member comprises a substantially rectangular portion adapted to lie in the corresponding rectangular recess and a web portion lying in a plane at right angles to the rectangular portion and extending between the outer face of the rectangular portion and the adjacent end face of the journal bearing member, and in which the rectangular portion of each lug has holes therein through which pass bolts or studs by which it is secured to the platform.

5. A connecting rod assembly as claimed in claim 4, in which the big end of the main connecting rod is provided with a groove in its bearing bore adapted to receive oil from the crankshaft, a groove in a part cylindrical surface with which a part of the outer surface of the big end of the subsidiary rod makes substantially oil-tight engagement, and at least one oil passage connecting the grooves, while the big end of the subsidiary rod is provided with at least one oil passage, one end of which communicates with the said groove in the part cylindrical surface while its other end communicates with the bearing bore of the big end of the subsidiary rod.

6. A connecting rod assembly as claimed in claim 1, in which arcuate recesses are formed in the adjacent faces of the two platforms and corresponding parts of the circumference of each of two end portions of the journal bearing member lie in the recesses.

7. A connecting rod assembly as claimed in claim 1, in which the platforms are formed with rectangular recesses, and each of the lugs on an end of the journal bearing member comprises a substantially rectangular portion adapted to lie in the corresponding rectangular recess and a web portion lying in a plane at right angles to the rectangular portion and extending between the outer face of the rectangular portion and the adjacent end face of the journal bearing member, and in which the rectangular portion of each lug has holes therein through which pass bolts or studs by which it is secured to the platform.

8. A connecting rod assembly as claimed in claim 1, in which the big end of the main connecting rod is provided with a groove in its bearing bore adapted to receive oil from the crankshaft, a groove in a part cylindrical surface with which a part of the outer surface of the big end of the subsidiary rod makes substantially oil-tight engagement, and at least one oil passage connecting the grooves, while the big end of the subsidiary rod is provided with at least one oil passage, one end of which communicates with the said groove in the part cylindrical surface while its other end communicates with the bearing bore of the big end of the subsidiary rod.

9. A connecting rod assembly as claimed in claim 1, in which a slot with a part cylindrical surface is formed between the two spaced platforms and a part of the big end of the subsidiary rod lies within the slot and makes substantially fluid-tight engagement with the said cylindrical surface, which also is provided with an oil groove, and an oil groove is provided in the bearing bore of the big end of the main connecting rod adapted to receive oil from the crankshaft, and at least one oil passage connects the grooves, while the big end of the subsidiary rod is provided with at least one oil passage, one end of which communicates with the said groove in the part cylindrical surface while its other end communicates with the bearing bore of the big end of the subsidiary rod.

BENJAMIN WILLIAM BARLOW.

REFERENCES CITED

The following references are of record in the file of this patent:

UNITED STATES PATENTS

| Number | Name | Date |
| --- | --- | --- |
| 1,500,662 | Vincent | July 8, 1924 |
| 1,687,917 | Woolson | Oct. 16, 1928 |
| 2,085,270 | Pavlecka | June 29, 1937 |
| 2,117,118 | Pavlecka | May 10, 1938 |
| 2,156,774 | Vincent | May 2, 1939 |
| 2,318,954 | Miller et al. | May 11, 1943 |